United States Patent
Wilkie

(10) Patent No.: US 10,744,958 B2
(45) Date of Patent: Aug. 18, 2020

(54) DRAWER ASSEMBLY FOR A WORK VEHICLE

(71) Applicant: CNH Industrial America LLC, New Holland, PA (US)

(72) Inventor: David Melvin Wilkie, Turin (IT)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 16/110,291

(22) Filed: Aug. 23, 2018

(65) Prior Publication Data
US 2019/0061643 A1 Feb. 28, 2019

Related U.S. Application Data

(60) Provisional application No. 62/550,088, filed on Aug. 25, 2017.

(51) Int. Cl.
| | | |
|---|---|---|
| *B60R 11/06* | (2006.01) | |
| *E05B 83/28* | (2014.01) | |
| *B60R 11/00* | (2006.01) | |

(52) U.S. Cl.
CPC .............. *B60R 11/06* (2013.01); *E05B 83/28* (2013.01); *B60R 2011/004* (2013.01)

(58) Field of Classification Search
CPC ....................................................... B60R 11/06
USPC ............................................... 296/37.8, 37.6
See application file for complete search history.

(56) References Cited

U.S. PATENT DOCUMENTS

| | | | |
|---|---|---|---|
| 4,676,415 A | 6/1987 | Kennedy | |
| 5,125,710 A * | 6/1992 | Gianelo | B60R 9/02 224/281 |
| 5,895,086 A | 4/1999 | Carico | |
| 6,899,379 B1 | 5/2005 | Milenovich | |
| 8,573,671 B2 * | 11/2013 | Watkins | B60R 11/06 296/37.8 |
| 2005/0140170 A1* | 6/2005 | Crean | B60P 3/36 296/156 |
| 2007/0158968 A1* | 7/2007 | Chandler | B60P 3/14 296/37.6 |

(Continued)

FOREIGN PATENT DOCUMENTS

| | | |
|---|---|---|
| DE | 102005002577 | 10/2006 |
| EP | 1167666 | 1/2002 |

(Continued)

OTHER PUBLICATIONS

PCT/US2018/047757 International Search Report and Written Opinion dated Oct. 26, 2018, 14 pgs.

*Primary Examiner* — Joseph D. Pape
(74) *Attorney, Agent, or Firm* — Rickard K. DeMille; Rebecca L. Henkel

(57) ABSTRACT

A drawer assembly for a work vehicle includes a drawer configured to slide between a closed position that blocks access to an interior of the drawer and an open position that facilitates access to the interior of the drawer. The drawer includes a first exterior body panel of the work vehicle, the drawer is positioned such that a second exterior body panel of the work vehicle at least partially surrounds the first exterior body panel while the drawer is in the closed position, and the first exterior body panel is configured to substantially align with the second exterior body panel while the drawer is in the closed position.

20 Claims, 5 Drawing Sheets

(56) References Cited

U.S. PATENT DOCUMENTS

2011/0121599 A1\* 5/2011 Goupil, Jr. ......... B60H 1/00271
296/37.12

FOREIGN PATENT DOCUMENTS

| EP | 1533188 | | 5/2005 |
|----|---------|----|--------|
| JP | 5642470 | B2 \* | 12/2014 |
| WO | 2010076591 | | 7/2010 |

\* cited by examiner

DRAWER ASSEMBLY FOR A WORK VEHICLE

CROSS REFERENCE TO RELATED APPLICATION

This application claims priority from and the benefit of U.S. Provisional Application Ser. No. 62/550,088, entitled "DRAWER ASSEMBLY FOR A WORK VEHICLE", filed Aug. 25, 2017, which is hereby incorporated by reference in its entirety.

BACKGROUND

The present disclosure relates generally to a drawer assembly for a work vehicle.

Certain work vehicles (e.g., tractors, harvesters, skid steers, etc.) include a tool box coupled to a body of the work vehicle. The tool box may store various tools that may be used for maintenance operations and/or to reconfigure the work vehicle. Typical tool boxes include a lid that is rotatably coupled to a body of the tool box. The lid may rotate between a closed position that blocks access to an interior of the body and an open position that facilitates access to the interior of the body. Unfortunately, the tool box, which is coupled to the work vehicle body, may reduce the aesthetic appearance of the work vehicle. In addition, the lid may enable unauthorized access to the tools within the tool box.

BRIEF DESCRIPTION

In one embodiment, a drawer assembly for a work vehicle includes a drawer configured to slide between a closed position that blocks access to an interior of the drawer and an open position that facilitates access to the interior of the drawer. The drawer includes a first exterior body panel of the work vehicle, the drawer is positioned such that a second exterior body panel of the work vehicle at least partially surrounds the first exterior body panel while the drawer is in the closed position, and the first exterior body panel is configured to substantially align with the second exterior body panel while the drawer is in the closed position.

In another embodiment, a work vehicle includes a first exterior body panel and a drawer assembly. The drawer assembly includes a drawer configured to slide between a closed position that blocks access to an interior of the drawer and an open position that facilitates access to the interior of the drawer. The drawer includes a second exterior body panel of the work vehicle, the first exterior body panel at least partially surrounds the second exterior body panel while the drawer is in the closed position, and the second exterior body panel substantially aligns with the first exterior body panel while the drawer is in the closed position.

In a further embodiment, a drawer assembly for a work vehicle includes a drawer configured to slide between a closed position that blocks access to an interior of the drawer and an open position that facilitates access to the interior of the drawer. The drawer includes a first exterior body panel of the work vehicle, and the drawer is configured to move the first exterior body panel away from a second exterior body panel of the work vehicle as the drawer slides from the closed position toward the open position. The drawer assembly also includes a locking mechanism configured to block movement of the drawer from the closed position while engaged and to enable movement of the drawer from the closed position while disengaged. The locking mechanism is configured to engage in response to receiving a signal indicative of locking a door to a cab of the work vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
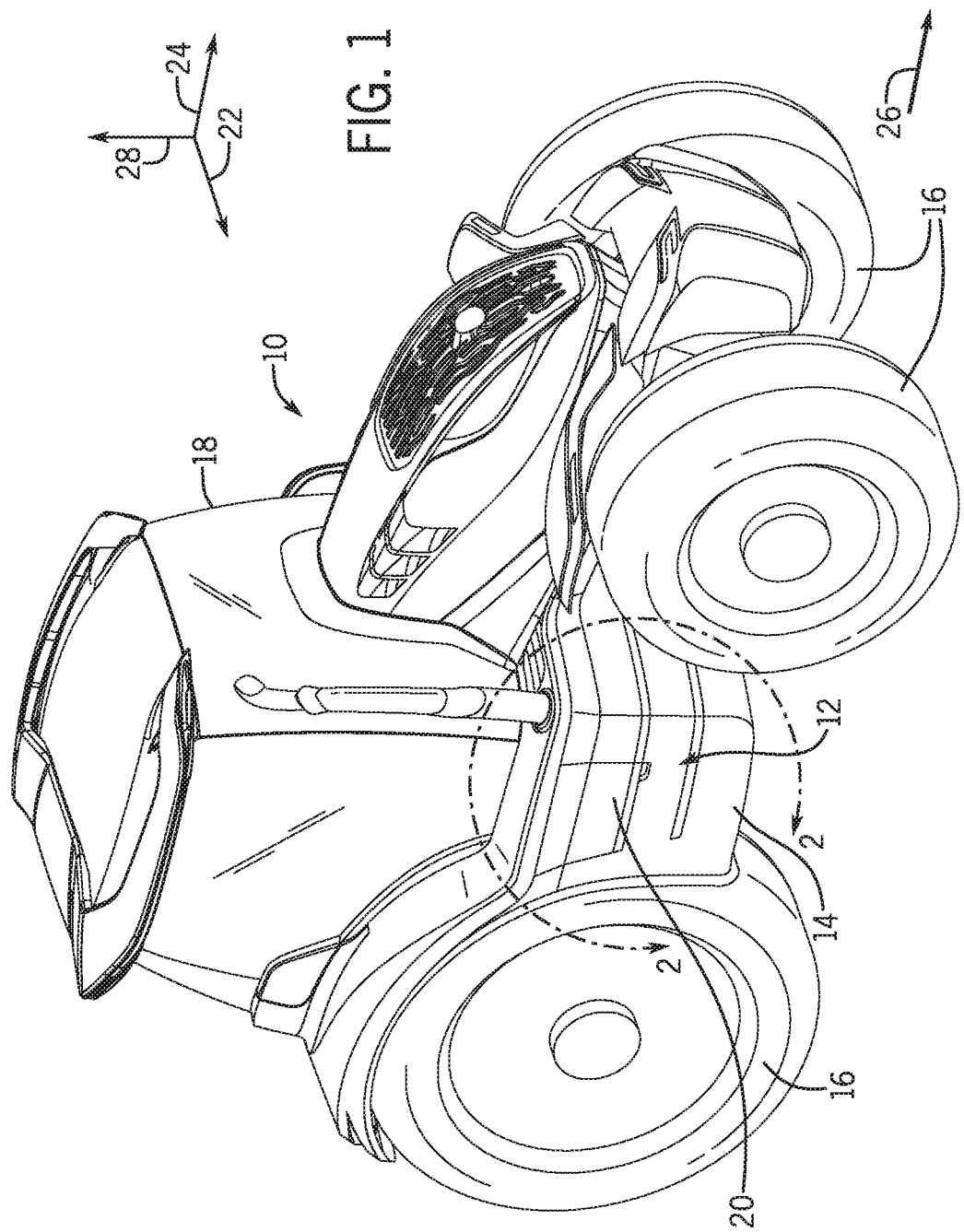
FIG. 1 is a perspective view of an embodiment of a work vehicle that includes an embodiment of a drawer assembly.

Turn now to the drawings, FIG. 1 is a perspective view of an embodiment of a work vehicle 10 that includes an embodiment of a drawer assembly 12. In the illustrated embodiment, the work vehicle 10 includes a body 14 configured to house an engine, a transmission, other systems of the work vehicle 10, or a combination thereof. In addition, the work vehicle 10 includes wheels 16 configured to be driven by the engine and transmission, thereby driving the work vehicle 10 along a field, a road, or any other suitable surface. The work vehicle 10 also includes a cab 18 configured to house an operator and controls (e.g., pedals, steering wheel, etc.) that enable the operator to control the work vehicle 10.

In the illustrated embodiment, the work vehicle 10 includes a drawer assembly 12 configured to house tools and/or other items. In certain embodiments, the drawer assembly includes a drawer 20 configured to slide between a closed position, as illustrated, and an open position. While the drawer 20 is in the illustrated closed position access to an interior of the drawer is blocked, and while the drawer is in the open position access to the interior of the drawer is facilitated. In the illustrated embodiment, the drawer 20 is configured to slide substantially along a lateral axis 22 between the open and closed positions. However, in alternative embodiments, the drawer may slide substantially along a longitudinal axis 24 (e.g., substantially parallel to a direction of travel 26 of the work vehicle 10), substantially along a vertical axis 28, or along another suitable axis. The drawer 20 includes a first exterior body panel, and the drawer is positioned such that a second exterior body panel of the work vehicle at least partially surrounds the first exterior body panel while the drawer is in the illustrated closed position. In addition, the first exterior body panel is configured to substantially align with the second exterior body panel while the drawer is in the illustrated closed position. Because the first and second exterior body panels are substantially aligned with one another while the drawer is in the closed position, the aesthetic appearance of the work vehicle may be enhanced (e.g., as compared to a work vehicle having an external tool box coupled to the work vehicle body).

While the drawer assembly 12 is positioned on a right side of the work vehicle below the cab 18 in the illustrated embodiment, in alternative embodiments, the drawer assembly may be positioned at another suitable location on the work vehicle. For example, the drawer assembly may be positioned on a left side of the work vehicle (e.g., adjacent to a door of the cab), on a front portion of the work vehicle, or on a rear portion of the work vehicle, among other locations. In addition, while the illustrated work vehicle includes one drawer assembly, in further embodiments, the work vehicle may include additional drawer assemblies (e.g., 1, 2, 3, 4, 5, 6, or more). Furthermore, while the illustrated work vehicle 10 is a tractor, it should be appreciated that the drawer assembly described herein may be employed within any other suitable type of work vehicle, such as a harvester, a sprayer, or a skid steer, among others.

Figure 2:
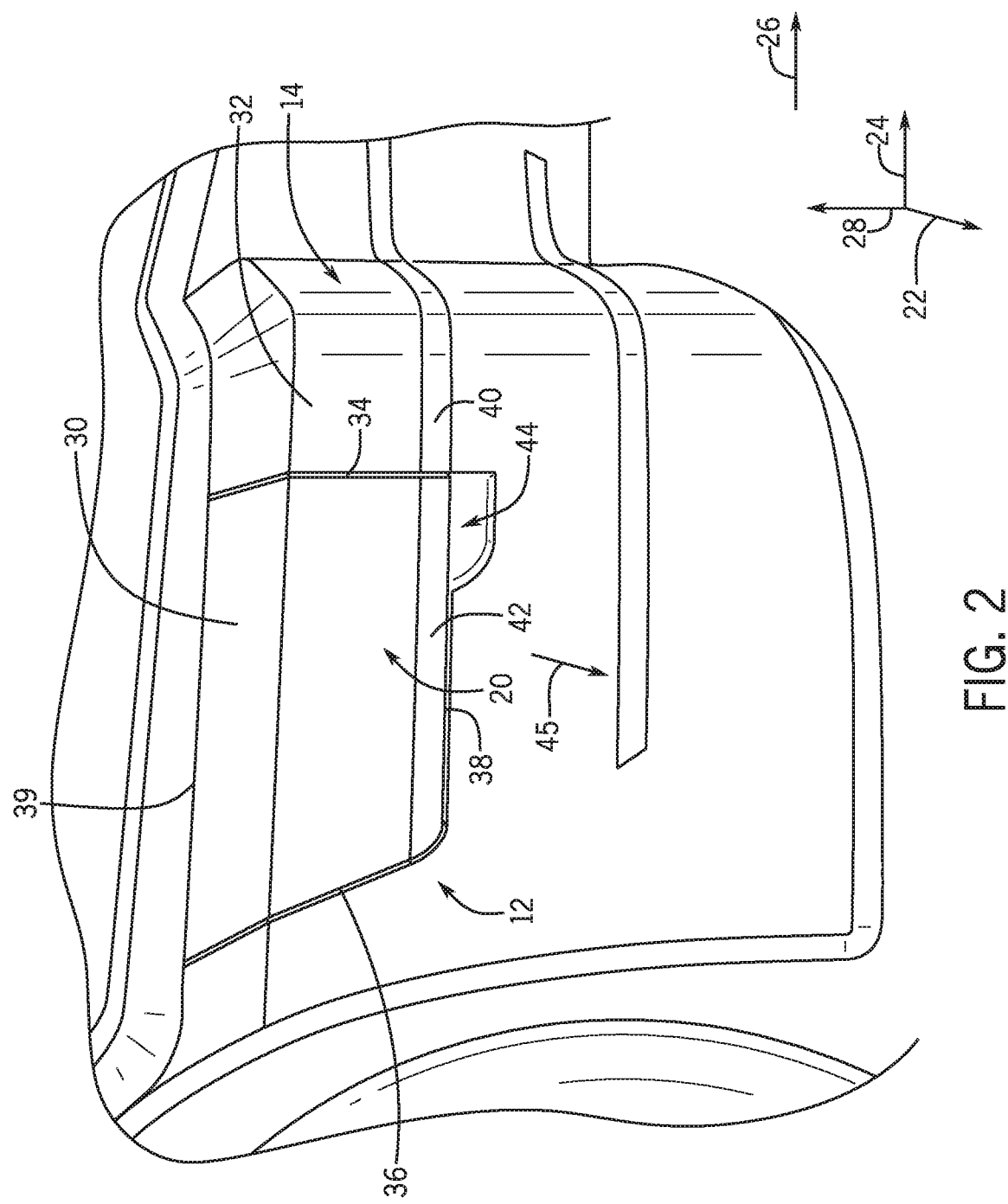
FIG. 2 is a front view of the drawer assembly of FIG. 1, taken within line 2-2 of FIG. 1, in which a drawer of the drawer assembly is in a closed position.

FIG. 2 is a front view of the drawer assembly 12 of FIG. 1, taken within line 2-2 of FIG. 1, in which the drawer 20 is in the closed position. With the drawer 20 in the illustrated closed position, access to the interior of the drawer is blocked. As illustrated, the drawer 20 includes an exterior body panel 30 (e.g., first exterior body panel, second exterior body panel, etc.). In addition, the body 14 includes an exterior body panel 32 (e.g., first exterior body panel, second exterior body panel, etc.) that partially surrounds the drawer exterior body panel 30 while the drawer 20 is in the illustrated closed position. As illustrated, the exterior body panels face outwardly from the work vehicle, thereby forming respective portions of the exterior of the work vehicle. In the illustrated embodiment, the drawer 20 is positioned such that the exterior body panel 32 surrounds the drawer exterior body panel 30 on a first side 34 (e.g., forward side relative to the direction of travel 26), on a second side 36 (e.g., rearward side relative to the direction of travel 26), and on a third side 38 (e.g., bottom side) while the drawer 20 is in the closed position. However, in alternative embodiments, the exterior body panel 32 may partially surround the drawer exterior body panel 30 on other side(s) while the drawer is in the close position. For example, in certain embodiments (e.g., embodiments in which the second side of the drawer exterior body panel is aligned with a rear edge of the surrounding exterior body panel), the surrounding exterior body panel may surround the drawer exterior body panel on the first side 34, on the third side 38, on a fourth side 39 (e.g., top side), or a combination thereof, while the drawer is in the closed position. By way of further example, the surrounding exterior body panel may surround the drawer exterior body panel on the first side, the second side, the third side, the fourth side, or a combination thereof, while the drawer is in the closed position. In further embodiments, the surrounding exterior body panel may completely surround the drawer exterior body panel while the drawer is in the illustrated closed position.

In the illustrated embodiment, the drawer exterior body panel 30 is substantially aligned with the surrounding exterior body panel 32 while the drawer 20 is in the illustrated closed position. In addition, as discussed in detail below, a first contour of the drawer exterior body panel 30 substantially corresponds to a second contour of the surrounding exterior body panel 32. Accordingly, the aesthetic appearance of the work vehicle may be enhanced (e.g., as compared to a work vehicle having an external tool box coupled to the work vehicle body). In the illustrated embodiment, a first trim element 40 is coupled to the surrounding exterior body panel 32, and a second trim element 42 is coupled to the drawer exterior body panel 30. As illustrated, the trim elements are substantially aligned with one another along the vertical axis 28, thereby further enhancing the aesthetic appearance of the work vehicle.

In the illustrated embodiment, the drawer exterior body panel 30 forms a lip at the third side 38. In addition, a recess 44 is formed in the surrounding exterior body panel 32. The recess 44 facilitates access to the lip, thereby enabling an operator to engage the lip and to move the drawer in an outward direction 45 toward the open position. While the lip and the recess are positioned at the third side of the drawer exterior body panel in the illustrated embodiment, in alternative embodiments, the lip and the recess may be positioned at the first side, the second side, the third side, the fourth side, or a combination thereof, of the drawer exterior body panel. In addition, the shape and/or depth of the recess may be particularly selected to facilitate access to the lip. Furthermore, in certain embodiments, the recess may be omitted. For example, the bottom side of the drawer exterior body panel may be aligned with a bottom edge of the surrounding exterior body panel, thereby enabling an operator to access the lip from under the drawer exterior body panel.

While the illustrated drawer exterior body panel includes four sides, in alternative embodiments, the drawer exterior body panel may include more or fewer sides (e.g., 3, 4, 5, 6, 7, 8, or more). In further embodiments, the drawer exterior body panel may include one or more curved sides, or the drawer exterior body panel may have an elliptical or circular shape, among others. In such embodiments, the surrounding exterior body panel may have a complementary shape.

Figure 3:
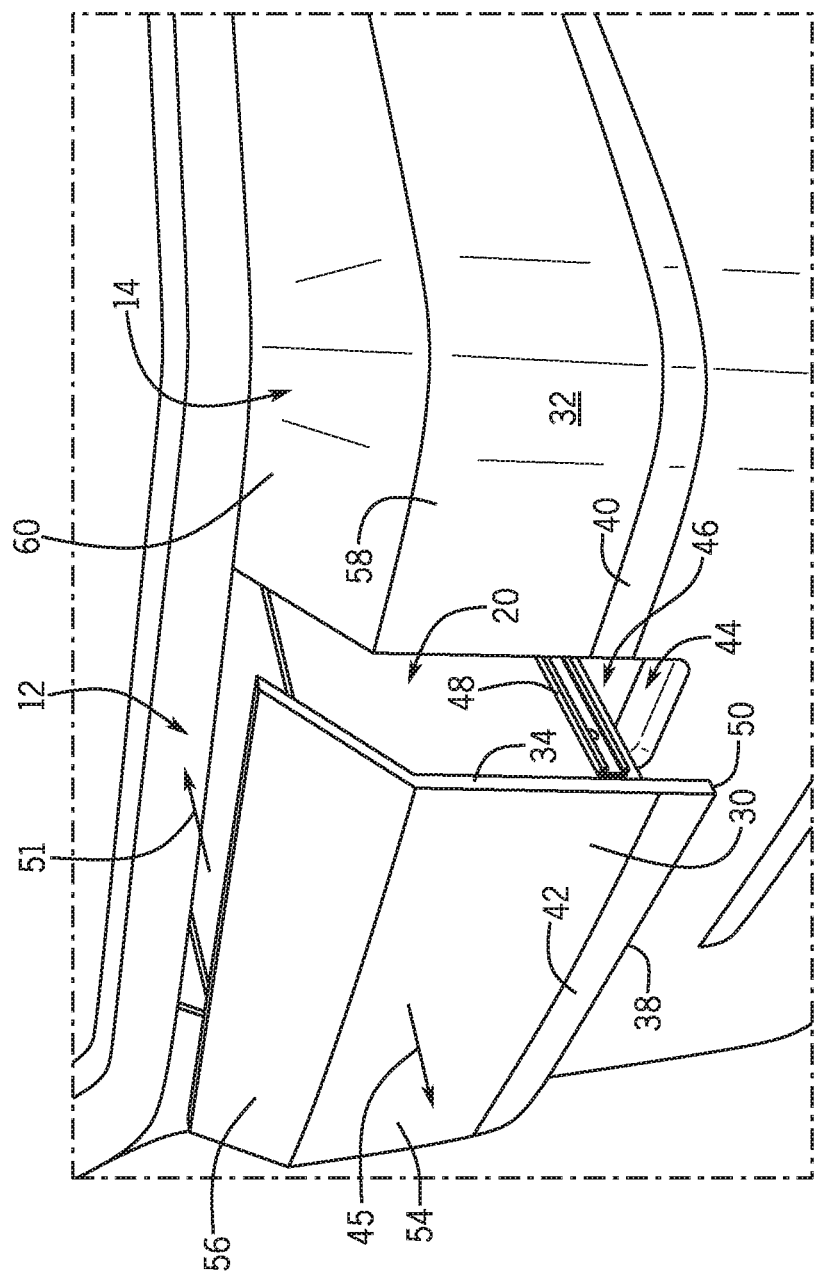
FIG. 3 is a perspective view of the drawer assembly of FIG. 1, in which the drawer is in an open position.
Figure 3:
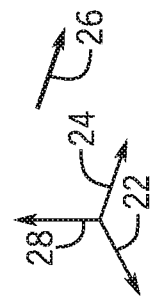

FIG. 3 is a perspective view of the drawer assembly 12 of FIG. 1, in which the drawer 20 is in the open position. In the illustrated embodiment, the drawer assembly 12 includes a sliding mechanism 46 configured to enable the drawer 20 to slide between the closed position and the illustrated open position. In the illustrated embodiment, the sliding mechanism 46 includes at least one rail 48 coupled to the drawer 20 and a roller rotatably coupled to a frame of the work vehicle. The roller is engaged with the rail 48, thereby slidably coupling the drawer 20 to the frame. While a single rail is shown, in certain embodiments, a second rail may be positioned on the opposite side of the drawer, and the second rail may be engaged with a corresponding roller. While the illustrated sliding mechanism includes rail(s) and roller(s), in alternative embodiments, the sliding mechanism may include interlocked rails, a tang and groove assembly, or any other suitable sliding mechanism. In further embodiments, the sliding mechanism may be omitted (e.g., the drawer may be slidably coupled to the frame by direct contact between surfaces of the drawer and corresponding surfaces of the frame). Furthermore, in certain embodiments, the sliding mechanism and/or the drawer may include a stop configured to block movement of the drawer in the outward direction 45 beyond the illustrated open position.

In the illustrated embodiment, the drawer exterior body panel 30 forms a lip 50 at the third side 38. The lip 50 enables fingers of an operator to engage the drawer exterior body panel 30, thereby enabling the operator to pull the drawer 20 in the outward direction 45 from the closed position toward the illustrated open position. Furthermore, the recess 44 in the surrounding exterior body panel 32 enables the fingers of the operator to access the lip. With the drawer 20 in the illustrated open position, the operator may transition the drawer 20 to the closed position by pushing the drawer exterior body panel 30 in an inward direction 51 toward the surrounding exterior body panel 32. Once in the closed position, contact between the drawer exterior body panel 30 and a frame of the work vehicle may block movement of the drawer in the inward direction 51 beyond the closed position. Additionally or alternatively, the drawer assembly may include a stop configured to block movement of the drawer in the inward direction 51 beyond the closed position. Because the lip enables the drawer to transition between the closed position and the illustrated open position, the aesthetic appearance of the drawer assembly may be enhanced (e.g., as compared to a drawer assembly having a handle extending from the drawer exterior body panel).

As previously discussed, a first contour of the drawer exterior body panel 30 substantially corresponds to a second contour of the surrounding exterior body panel 32. In the illustrated embodiment, the drawer exterior body panel 30 has a substantially flat portion 54 and an angled portion 56. In addition, the surrounding exterior body panel 32 has a substantially flat portion 58 and an angled portion 60. While the drawer 20 is in the closed position, the substantially flat portions are substantially aligned with one another, and the angled portions are substantially aligned with one another. Accordingly, the region of the work vehicle exterior including the drawer exterior body panel 30 may appear substantially continuous while the drawer is in the closed position. In addition, the first trim element 40 and the second trim element 42 are substantially aligned with one another while the drawer is in the closed position, thereby maintaining the substantially continuous appearance. As a result of the continuous appearance of the region, the aesthetic appearance of the work vehicle may be enhanced (e.g., as compared to a work vehicle having an external tool box couple to the body). While each illustrated exterior body panel includes a substantially flat portion and an angled portion, in further embodiments, each exterior body panel may include more or fewer substantially flat portions (e.g., 0, 1, 2, 3, 4, or more), more of fewer angled portions (e.g., 0, 1, 2, 3, 4, or more), one or more other portions (e.g., curved portion(s), concave portion(s), etc.), or a combination thereof.

Figure 4:
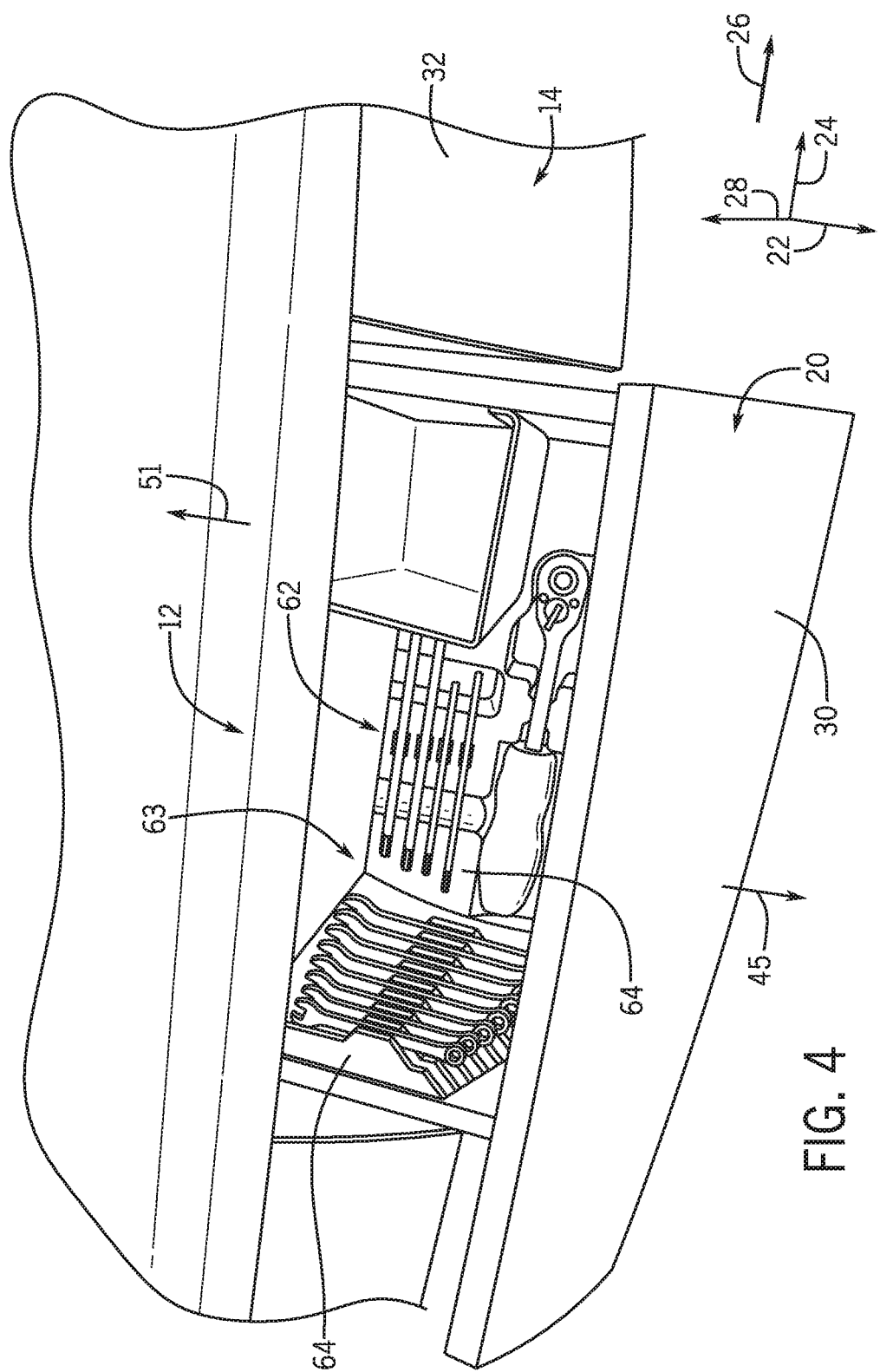
FIG. 4 is a top view of the drawer assembly of FIG. 1, in which the drawer is in the open position.

FIG. 4 is a top view of the drawer assembly 12 of FIG. 1, in which the drawer 20 is in the open position. With the drawer 20 in the illustrated open position, an operator may access an interior 62 of the drawer 20 through an opening 63. The interior 62 of the drawer 20 may be used to store/house any suitable item (e.g., for use on the work vehicle, etc.). As illustrated, tools are disposed within the interior 62 of the drawer 20. However, any other suitable item may be disposed within the interior 62 of the drawer 20 (e.g., spare part(s), fastener(s), connector(s), etc.). To retain the tools during operation of the work vehicle, the drawer assembly 12 includes a retaining system 64. In the illustrated embodiment, the retaining system 64 includes slots configured to secure the tools. However, in other embodiments, the retaining system may be configured to retain other and/or additional suitable items within the drawer interior 62 (e.g., spare part(s), faster(s), connector(s), etc.).

Figure 5:
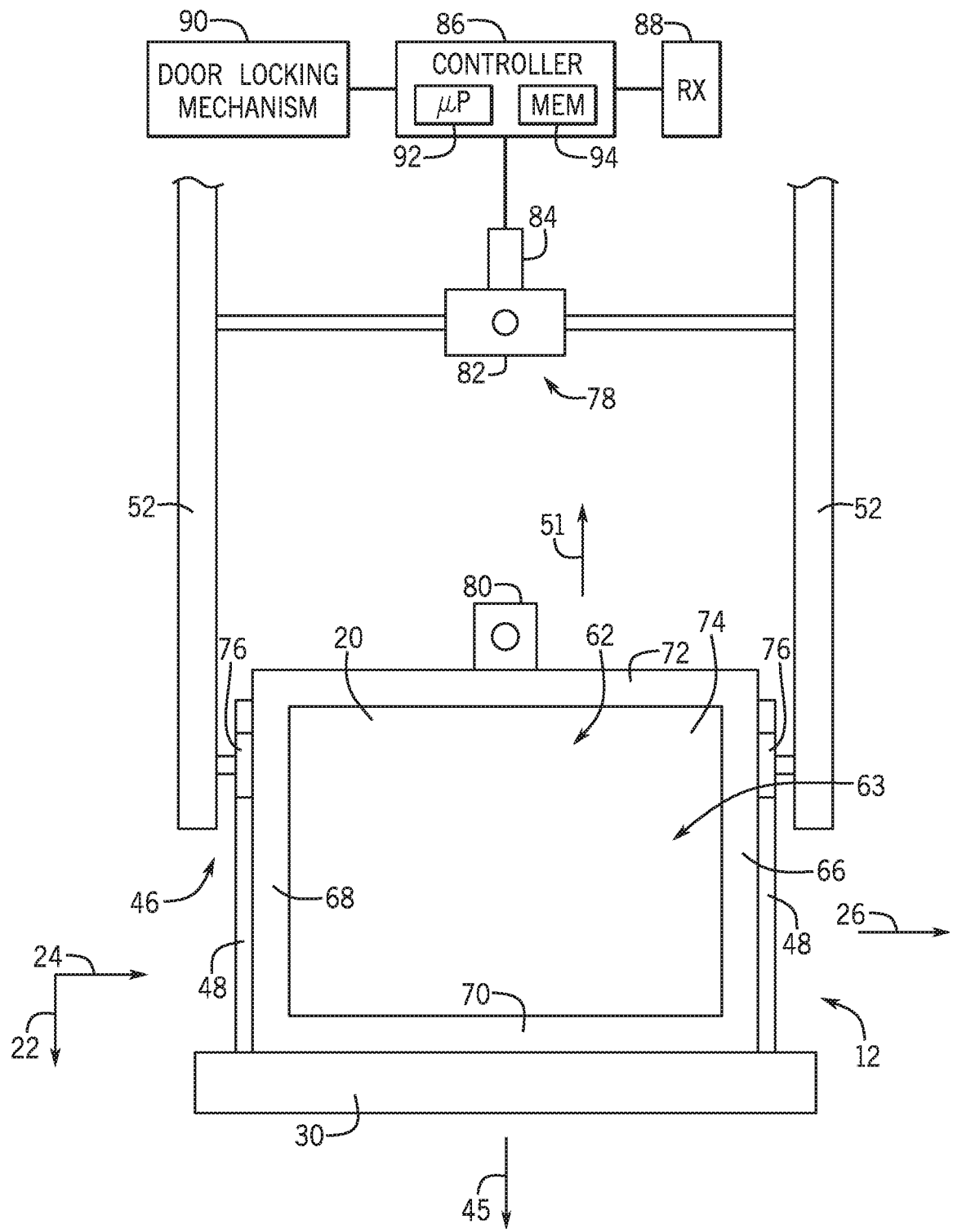
FIG. 5 is a schematic diagram of an embodiment of a drawer assembly that may be used within the work vehicle of FIG. 1.

FIG. 5 is a schematic diagram of an embodiment of a drawer assembly 12 that may be used within the work vehicle of FIG. 1. In the illustrated embodiment, the drawer 20 of the drawer assembly 12 is formed by a first wall 66 positioned on a first longitudinal side of the drawer 20, a second wall 68 positioned on a second longitudinal side of the drawer 20, opposite the first longitudinal side, a third wall 70 positioned on a first lateral side of the drawer 20, and a fourth wall 72 positioned on a second lateral side of the drawer 20, opposite the first lateral side. The drawer 20 also includes a bottom wall 74 that forms a bottom of the drawer 20. The walls establish the interior 62 of the drawer and the opening 63 that enables items to be disposed within and removed from the interior 62. While the drawer is substantially rectangular (e.g., substantially square) in the illustrated embodiment, the drawer may have other suitable shapes in alternative embodiments (e.g., polygonal, semi-circular, etc.). In the illustrated embodiment, the drawer exterior body panel 30 is coupled to the third wall 70 of the drawer 20. However, in alternative embodiments, the drawer exterior body panel may form the third wall of the drawer.

In the illustrated embodiment, the drawer assembly 12 includes a sliding mechanism 46 configured to enable the drawer 20 to slide between the closed position and the illustrated open position. As illustrated, the sliding mechanism 46 includes a first rail 48 coupled to the first wall 66 and a second rail 48 coupled to the second wall 68. In addition, the sliding mechanism includes two rollers 76 each engaged with a respective rail 48 and rotatably coupled to the frame 52 of the work vehicle. Engagement between the rollers 76 and the rails 48 slidably couples the drawer 20 to the frame 52 and enables the drawer 20 to move between the closed position and the illustrated open position. While the rails are coupled to the drawer and the rollers are coupled to the frame in the illustrated embodiment, in alternative embodiments, the rails may be coupled to the frame and the rollers may be coupled to the drawer. Furthermore, while the illustrated embodiment includes two rails and two rollers, in alternative embodiments, the sliding mechanism may include more or fewer rails and/or more or fewer rollers. For example, in certain embodiments, the sliding mechanism may include a single rail coupled to the bottom wall and a single roller engaged with the rail and rotatably coupled to the frame. Furthermore, while the illustrated sliding mechanism includes rail(s) and roller(s), in alternative embodiments, the sliding mechanism may include interlocked rails, a tang and groove assembly, or any other suitable sliding mechanism. In further embodiments, the sliding mechanism may be omitted (e.g., the drawer may be slidably coupled to the frame by direct contact between surfaces of the drawer and corresponding surfaces of the frame).

In the illustrated embodiment, the drawer assembly 12 includes a locking mechanism 78 configured to block movement of the drawer 20 from the closed position while engaged and to enable movement of the drawer 20 from the closed position while disengaged. In the illustrated embodiment, the locking mechanism 12 includes a first engagement element 80 coupled to the drawer 20 and a second engagement element 82 coupled to the frame 52. In certain embodiments, the first engagement element 80 may include an opening, and the second engagement element 82 may include a movable pin configured to engage the opening. Accordingly, while the pin is engaged with the opening, movement of the drawer is blocked, and while the pin is disengaged from the opening, movement of the drawer in enabled. In other embodiments, any other suitable engagement elements may be utilized to selectively block movement of the drawer.

In the illustrated embodiment, the locking mechanism 78 includes an actuator 84 (e.g., solenoid, linear actuator, rotary actuator, etc.) configured to drive the first engagement element 80 to engage the second engagement element 82 (e.g., to drive the pin to engage the opening) and to drive the first engagement element 80 to disengage the second engagement element 82 (e.g., to drive the pin to disengage the opening). The actuator 84 is communicatively coupled to a controller 86. The controller 86 is also communicatively coupled to a receiver 88 and to a door locking mechanism 90.

In certain embodiments, the controller 86 is an electronic controller having electrical circuitry configured to process data from the receiver 88 and/or other components of the work vehicle. In the illustrated embodiment, the controller 86 include a processor, such as the illustrated microprocessor 92, and a memory device 94. The controller 86 may also include one or more storage devices and/or other suitable components. The processor 92 may be used to execute software, such as software for controlling the actuator 84, software for controlling the door locking mechanism 90, and so forth. Moreover, the processor 92 may include multiple microprocessors, one or more "general-purpose" microprocessors, one or more special-purpose microprocessors, and/or one or more application specific integrated circuits (ASICS), or some combination thereof. For example, the processor 92 may include one or more reduced instruction set (RISC) processors.

The memory device 94 may include a volatile memory, such as random access memory (RAM), and/or a nonvolatile memory, such as read-only memory (ROM). The memory device 94 may store a variety of information and may be used for various purposes. For example, the memory device 94 may store processor-executable instructions (e.g., firmware or software) for the processor 92 to execute, such as instructions for controlling the actuator 84, instructions for controlling the door locking mechanism 90, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the actuator and/or the door locking mechanism, etc.), and any other suitable data.

In the illustrated embodiment, the locking mechanism 78 is configured to engage in response to receiving a signal indicative of locking a door to the cab of the work vehicle. For example, after an operator leaves the cab and closes the cab door, the operator may instruct (e.g., by depressing a lock button) a wireless transmitter (e.g., key fob) to output a signal (e.g., radio signal) indicative of locking the cab door. The signal may be received by the receiver 88, and in response, the receiver 88 may output a corresponding signal to the controller 86 indicative of reception of the door locking signal. The controller 86, in turn, may output a signal to the door locking mechanism 90 indicative of instructions to lock the cab door. In addition, the controller 86 may output another signal to the actuator 84 indicative of instructions to drive the first engagement element 80 to engage the second engagement element 82 (e.g., to drive the pin to engage the opening), thereby locking the drawer 20 in the closed position. Because the locking mechanism engages in response to receiving the signal indicative of locking the cab door, unauthorized access to the items within the interior of the drawer may be blocked while the cab door is locked.

In certain embodiments, the locking mechanism 78 is also configured to disengage in response to receiving a signal indicative of unlocking the cab door. For example, as an operator approaches the cab, the operator may instruct (e.g., by depressing an unlock button) a wireless transmitter (e.g., key fob) to output a signal (e.g., radio signal) indicative of unlocking the cab door. The signal may be received by the receiver 88, and in response, the receiver 88 may output a corresponding signal to the controller 86 indicative of reception of the door unlocking signal. The controller 86, in turn, may output a signal to the door locking mechanism 90 indicative of instructions to unlock the cab door. In addition, the controller 86 may output another signal to the actuator 84 indicative of instructions to drive the first engagement element 80 to disengage the second engagement element 82 (e.g., to drive the pin to disengage the opening), thereby unlocking the drawer 20. Because the locking mechanism disengages in response to receiving the signal indicative of unlocking the cab door, the interior of the drawer may be accessed while the cab door is unlocked.

In certain embodiments, if the locking mechanism is engaged while the drawer is in the open position, the drawer may move freely until the first engagement element 80 engages the second engagement element 82 (e.g., as the drawer reaches the closed position). Upon engagement of the engagement elements, the drawer may be locked in the closed position. In further embodiments, the locking mechanism may include a sensor configured to output a signal indicative of presence of the drawer in the closed position. In such embodiments, the controller may instruct the actuator to drive the first engagement element to engage the second engagement element in response to receiving the door locking signal and the closed position signal. For example, if the door locking signal is received while the drawer is in the open position, the controller may not instruct the actuator to drive the first engagement element to engage the second engagement element until the closed position signal is received.

In certain embodiments, the controller may be configured to instruct the door locking mechanism to lock the cab door and/or the actuator to drive the first engagement element to engage the second engagement element in response to other input(s). For example, if the work vehicle engine is not activated and the cab door is closed, the controller may instruct the door locking mechanism to lock the cab door and/or the actuator to drive the first engagement element to engage the second engagement element after a threshold delay time (e.g., 1 minute, 5 minutes, etc.). In addition, the controller may be configured to instruct the door locking mechanism to lock the cab door and/or the actuator to drive the first engagement element to engage the second engagement element in response to detection of vehicle movement and/or in response to detection of a vehicle speed greater than a threshold speed (e.g., 1 km/h, 2 km/h, etc.). Automatically locking the drawer in the closed position while the work vehicle is moving (e.g., above a threshold speed) may substantially reduce the possibility of the drawer opening during operation of the work vehicle.

In further embodiments, the locking mechanism may include a mechanical linkage between the drawer and a cab door locking mechanism (e.g., the door locking mechanism 90). In such embodiments, the mechanical linkage may lock the drawer in the closed position while the cab door is locked and unlock the drawer while the cab door is unlocked. Furthermore, in certain embodiments, the locking mechanism may include a solenoid, or other suitable actuator, configured to drive the drawer away from the locked position upon receiving the door unlocking signal. In such embodiments, the recess in the surrounding exterior body panel and/or the lip of the drawer may be omitted. In further embodiments, the locking mechanism may include an actuator (e.g., motor, linear actuator, etc.) configured to drive the drawer between the closed position and the open position. In such embodiments, the locking mechanism may drive the drawer to the closed position upon receiving the door locking signal, and/or the locking mechanism may drive the drawer to the open position upon receiving the door unlocking signal. In addition, the locking mechanism may maintain the drawer in the open position and/or the closed position upon reaching the respective position. In such embodiments, the recess in the surrounding exterior body panel and/or the lip of the drawer may be omitted. Furthermore, in certain embodiments, the locking mechanism may be omitted.

The embodiment of the drawer assembly disclosed with reference to FIG. 5 may be used alone or in combination with the embodiment disclosed with reference to FIGS. 2-4. In addition, the embodiment of the drawer assembly disclosed with reference to FIGS. 1-4 may be used alone or in combination with the embodiment disclosed with reference to FIG. 5.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A drawer assembly for a work vehicle, comprising:
a drawer configured to slide between a closed position that blocks access to an interior of the drawer and an open position that facilitates access to the interior of the drawer, wherein the drawer includes a first exterior body panel of the work vehicle, the drawer is positioned such that a second exterior body panel of the work vehicle at least partially surrounds the first exterior body panel while the drawer is in the closed position, and the first exterior body panel is configured to substantially align with the second exterior body panel while the drawer is in the closed position; and
a locking mechanism configured to engage in response to receiving a signal indicative of locking a door to a cab of the work vehicle and disengage in response to receiving a signal indicative of unlocking the door to the cab of the work vehicle, wherein the locking mechanism is configured to block movement of the drawer from the closed position while engaged and to enable movement of the drawer from the closed position while disengaged, and the locking mechanism comprises an actuator configured to drive the drawer away from the closed position in response to receiving the signal indicative of unlocking the door to the cab of the work vehicle.

2. The drawer assembly of claim 1, comprising a sliding mechanism configured to enable the drawer to slide between the closed position and the open position.

3. The drawer assembly of claim 2, wherein the sliding mechanism comprises a rail coupled to the drawer and a roller configured to rotatably couple to a frame of the work vehicle, and wherein the roller is engaged with the rail to slidably couple the drawer to the frame.

4. The drawer assembly of claim 1, wherein a first contour of the first exterior body panel is configured to substantially correspond to a second contour of the second exterior body panel.

5. The drawer assembly of claim 1, comprising a retaining system disposed within the interior of the drawer, wherein the retaining system is configured to secure at least one tool within the interior of the drawer.

6. A work vehicle comprising:
a first exterior body panel; and
a drawer assembly comprising:
a drawer configured to slide between a closed position that blocks access to an interior of the drawer and an open position that facilitates access to the interior of the drawer, wherein the drawer includes a second exterior body panel of the work vehicle, the first exterior body panel at least partially surrounds the second exterior body panel while the drawer is in the closed position, and the second exterior body panel substantially aligns with the first exterior body panel while the drawer is in the closed position; and
a locking mechanism configured to engage in response to receiving a signal indicative of locking a door to a cab of the work vehicle and disengage in response to receiving a signal indicative of unlocking the door to the cab of the work vehicle, wherein the locking mechanism is configured to block movement of the drawer from the closed position while engaged and to enable movement of the drawer from the closed position while disengaged, and the locking mechanism comprises an actuator configured to drive the drawer from the open position to the closed position in response to receiving the signal indicative of locking the door to the cab of the work vehicle.

7. The work vehicle of claim 6, wherein the second exterior body panel forms a lip configured to enable an operator to move the drawer from the closed position toward the open position.

8. The work vehicle of claim 7, wherein the first exterior body panel forms a recess configured to facilitate access to the lip.

9. The work vehicle of claim 6, wherein the drawer assembly comprises a sliding mechanism configured to enable the drawer to slide between the closed position and the open position.

10. The work vehicle of claim 6, wherein a first contour of the first exterior body panel substantially corresponds to a second contour of the second exterior body panel.

11. A drawer assembly for a work vehicle, comprising:
a drawer configured to slide between a closed position that blocks access to an interior of the drawer and an open position that facilitates access to the interior of the drawer, wherein the drawer includes a first exterior body panel of the work vehicle, and the drawer is configured to move the first exterior body panel away from a second exterior body panel of the work vehicle as the drawer slides from the closed position toward the open position;
a locking mechanism configured to block movement of the drawer from the closed position while engaged and to enable movement of the drawer from the closed position while disengaged, wherein the locking mechanism comprises a sensor configured to output a first signal indicative of the drawer being positioned in the closed position; and
a controller comprising a memory and a processor, wherein the controller is configured to instruct the locking mechanism to engage in response to receiving the first signal indicative of the drawer being positioned in the closed position and a second signal indicative of locking a door to a cab of the work vehicle.

12. The drawer assembly of claim 11, wherein the drawer is positioned such that the second exterior body panel at least partially surrounds the first exterior body panel while the drawer is in the closed position.

13. The drawer assembly of claim 11, wherein a first contour of the first exterior body panel is configured to substantially correspond to a second contour of the second exterior body panel.

14. The drawer assembly of claim 11, comprising a sliding mechanism configured to enable the drawer to slide between the closed position and the open position.

15. The drawer assembly of claim 14, wherein the sliding mechanism comprises a rail coupled to the drawer and a roller configured to rotatably couple to a frame of the work vehicle, and wherein the roller is engaged with the rail to slidably couple the drawer to the frame.

16. The drawer assembly of claim 11, comprising a retaining system disposed within the interior of the drawer, wherein the retaining system is configured to secure at least one tool within the interior of the drawer.

17. The drawer assembly of claim 1, wherein the locking mechanism comprises a first engagement element coupled to the drawer and a second engagement element coupled to a frame of the work vehicle, and the first engagement element and the second engagement element are configured to engage one another to block movement of the drawer from the closed position while the locking mechanism is engaged.

18. The drawer assembly of claim 17, wherein the first engagement element includes an opening and the second engagement includes a moveable pin.

19. The work vehicle of claim 6, wherein the actuator is configured to drive the drawer from the closed position to the open position in response to receiving the signal indicative of unlocking the door to the cab of the work vehicle.

20. The drawer assembly of claim 11, wherein the locking mechanism comprises a first engagement element coupled to the drawer and a second engagement element coupled to a frame of the work vehicle, and the first engagement element and the second engagement element are configured to engage one another to block movement of the drawer from the closed position while the locking mechanism is engaged.

* * * * *